UNITED STATES PATENT OFFICE 2,135,775

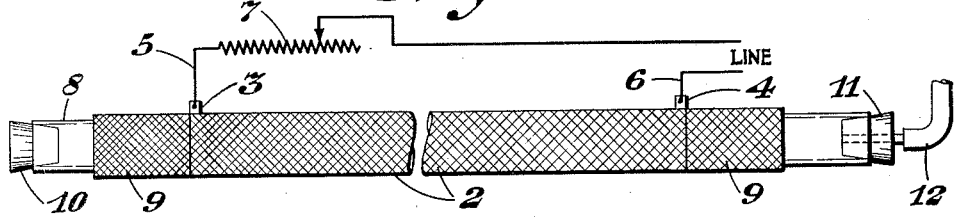
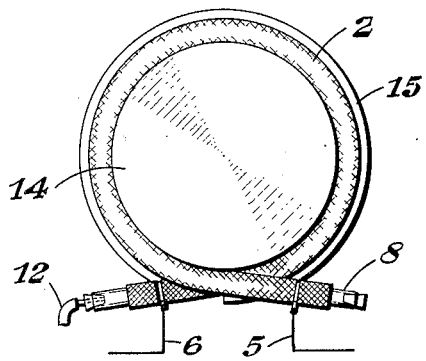
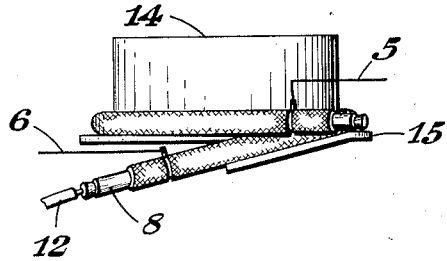
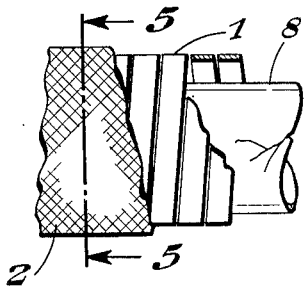
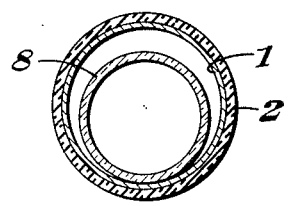
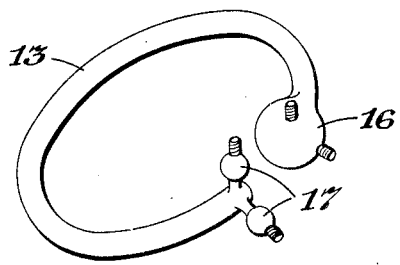

METHOD OF AND APPARATUS FOR BENDING VITREOUS TUBING

Warren R. Walker, Short Hills, N. J., assignor to General Electric Vapor Lamp Company, Hoboken, N. J., a corporation of New Jersey Application October 12, 1934, Serial No. 748,133

7 Claims. (Cl. 49—7)

The present invention relates to the shaping of vitreous bodies, and more particularly to the bending of glass tubing.

A particular object of the invention is to provide a novel method of bending glass tubing into a desired configuration. Another object of the invention is to produce the desired curvature in glass tubing without deforming the cross sectional shape thereof. A further object of the invention is to provide a method of bending glass tubing which will be extremely simple, whereby it can be practiced by persons without special skill in the art of glass working. Another object of my invention is to provide novel apparatus for producing my new result. Another object of the invention is to eliminate strains in the finished product. Another object of my invention is to reduce the expense of producing glass tubing in complicated configurations. Still other objects and advantages of my invention will appear from the following detailed specification, or from the accompanying drawing, or both.

The invention consists in the novel steps of the method, and in the novel apparatus, as hereinafter set forth and claimed.

In the manufacture of various types of electric gaseous discharge devices it is often necessary to bend the tubing which is ordinarily used therefor into various configurations, either to present a legend or design, or to alter the light distribution therefrom. This bending has heretofore presented a number of such serious difficulties that it could be done only by highly skilled glass workers, and even then it was virtually impossible to avoid undesirable deformities. It has thus been impossible to produce any uniformity in the product, and in addition the process has been extremely expensive, due to the time and skill required. These difficulties have moreover increased rapidly with increases in the size of the tubing employed, and are especially marked where tubing of the order of one inch in diameter is employed.

I have now discovered that these difficulties can be entirely overcome with a novel method of tube bending of my invention. According to this novel invention a considerable portion of the tube is heated up to a substantially uniform temperature at which the walls thereof are slightly plastic, and the tube then bent to the desired shape, after which the tube is slowly cooled until the strain temperature is reached, so as to insure a freedom from strains. During the bending of the tube air under pressure is preferably admitted thereto since I have discovered that this eliminates the tendency of the tube to flatten out or to kink as it is bent. While this process can be carried out in various fashions, as in various types of ovens, for example, I have found that the best results are attained by use of a novel apparatus of my invention. This novel apparatus consists of a flexible tube of resistance material, which is conveniently formed of closely wound turns of ribbon conductor, which has an inside diameter slightly larger than the tube which is to be bent. In the preferred form this tube is enclosed within a heat retaining sheath which not only reduces the wattage required, but which also prolongs the cooling period, so that strains are avoided. This sheath also protects the resistance from mechanical damage and likewise makes it easier to handle.

For the purpose of illustration I have shown a preferred embodiment of my novel apparatus in the accompanying drawing, in which Fig. 1 is an elevational view of my novel apparatus with the tube therein prior to bending, the electrical connections therefor being schematically indicated, Figs. 2 and 3 are plan and elevational views, respectively, of the same apparatus, showing the tube and heater bent around a suitable form, Fig. 4 is a fragmentary view, in part cut away, of the heating tube, Fig. 5 is a sectional view of the same tube, taken on the line 5—5 of Fig. 4, and Fig. 6 is a perspective view of a mercury vapor arc lamp of the well known Cooper Hewitt type having an arc tube bent with the apparatus of the preceding figures.

As shown in this drawing my novel apparatus has a heating tube 1 of helically wound flat conductor of any suitable resistance material, as is shown in Fig. 4. In practice this heater is formed of a strip of nichrome wire $\tfrac{1}{8}$ of an inch wide and 60 mils thick with closely adjacent turns, so as to form substantially a continuous tube. These wires are preferably oxidized on their surface to prevent short circuiting between turns, since this form of insulation offers no obstruction to the transfer of radiant energy to an enclosed vitreous tube, nor does it appreciably impede heat conduction thereto. This oxidation can be either produced by heating before the helix is wound or afterward. In the latter case the turns are pulled slightly apart and sufficient current passed therethrough to raise them to a temperature at which the surface will rapidly oxidize, after which the turns are pushed tightly together while the coils are still hot. This heater is preferably enclosed within a heat insulating body such as the woven asbestos sheath 2, the terminals 3 and 4 extending out of the ends of said sheath. Said terminals are connected through flexible leads 5 and 6, respectively, to a suitable source of current, such as the usual commercial supply of 110 volts A. C. or D. C., a variable resistance 7 being included in one of said leads. Said resistance is adjusted to permit a current of the order of 25 amperes to flow in actual practice of the invention. A glass tube 8 which is to be bent is inserted within said heater 1, which makes a loose fit therewith. Thus where one inch tubing is to be bent I prefer to make the heater 1 with an inside diameter of approximately 1 1/16 inches. The ends of said tube 8 project outwardly from said sheath, and a pair of woven asbestos sleeves 9 are slipped over these projecting ends in contact with the sheath 2, said sleeves reducing the cooling effects of the atmosphere on the portions of said tube 8 which are adjacent to the ends of the heater 1. Said sleeves are ordinarily three or four inches in length, this being found sufficient to produce the desired result. One end of said tube 8 is closed with a suitable stopper 10, or in any other suitable manner, while the other end of said tube is closed with a stopper 11 to which an air hose 12 is attached, said stopper 11 having a suitable opening extending therethrough for the admission of air under pressure to said tube.

A form for bending the tube 8 completes this equipment. Where it is desired to form a circle lying in a plane, as for the lamp 13 shown in Fig. 6, the apparatus shown in Figs. 2 and 3 is preferably employed. As there shown there is a vertical cylinder 14, about which extends a flange 15 on which the tube 8, with its enclosing heater 1 and sheath 2, is adapted to be laid. In order to overlap the ends of the tube 8, and thus to produce as complete a circle as possible, said flange 15 is cut near the front thereof, as illustrated, and one end thereof bent downwardly and tangentially to said cylinder 14. This downward angle is made just enough to provide clearance between the two ends of the heater, so that the heater and its sheath may be easily slid from the tube 8 without bending at the point of overlap.

In the use and operation of the foregoing apparatus to carry out my novel method a glass tube 8 is placed within the heater 1 and the sleeves 9 placed over the ends of said tube in contact with the sheath 2. The heater 1 is then connected to its source of energy and the tube 8 slowly heated to its softening temperature. During this heating interval, or before, the stopper 10 is inserted within the tube 8 to make that end thereof air tight, and the stopper 11 is likewise inserted at this time, but without the air hose 12 attached, so that there will be no tendency to increase the diameter of the tube during this heating period. As soon as said tube has reached a temperature at which it can be bent readily the air hose 12 is connected with the stopper 11 and air pressure of the order of 2 pounds per square inch applied to the inside of said tube 8. Said tube is then lifted by the ends thereof and placed on the flange 15 about the cylinder 14. In practice the middle of the tube is first placed in contact with said cylinder, and the ends are then slowly wrapped around as shown, with the downwardly depending end preferably placed in position first, the turns of the heater 1 opening slightly on the outside to permit the operation. The air hose 12 is then removed, and the heating circuit interrupted in any suitable manner, the ends of the tube then being held in the desired position until it has cooled sufficiently to again be rigid. The tube is then allowed to cool down still further within the heater 1 until it is below the temperature at which permanent strains can be introduced in the particular glass being used, after which the sleeves 9 are removed and the heater 1 is slid off one end of said tube 8. The tube 8 is then allowed to cool uniformly to room temperature, after which it is ready for any desired use. Thus as shown in Fig. 6 the ends of the tube, which do not follow the curve of the remainder, since they are not rendered plastic, are removed and the conventional cathode bulb 16 and anode chambers 17 spliced thereto to form a coplanar mercury vapor arc lamp 13 of the Cooper Hewitt type in which the light source is substantially a perfect circle. Such a lamp has been found to be exceptionally desirable for use in combination with an incandescent lamp to produce an approximation of white light, since it greatly facilitates the desired blending of the illumination from the different sources. Needless to say the product of my novel method and apparatus is extremely uniform and thus lends itself admirably to the manufacture of this product.

I have found that the use of air pressure within the tube, as described hereinbefore, greatly improves the results which are attained in that this pressure eliminates the tendency to flatten the tube at the bends, or to produce corrugations on the inside of the curve. With air at the proper pressure these results are entirely avoided without increase in the tube diameter, provided that the pressure is not too long applied, it being noted that this application of pressure is preferably limited to the time actually required to bend the tube to the desired form. As a result the heater 1 still makes a very loose fit with the tube 8 after the bending is completed, so that it is easily removed therefrom by sliding it along said tube.

As noted hereinbefore the asbestos sheath 2 greatly conserves the heat produced by the heater 1, and thus makes it easier to render the tube 8 plastic. Even more important, however, it materially slows down the rate of cooling of the tube 8 after the heat is cut off, and thus prevents the formation of strains during the cooling period. Similarly the sleeves 9 reduce the cooling at the ends of the tube 8 and thus make it possible to produce a perfect bend at a point closer to the end of the heater 1 than would otherwise be possible. Likewise these sleeves 9 reduce the temperature gradient in the tube 8 adjacent to the ends of the heater 1, and thus eliminate the tendency to strain the glass at this point. The practically continuous turns of the heater 1 are also important since they produce a very uniform heating of the tube 8.

From the foregoing it will be apparent that the heater 1 should be slightly longer than the section of the tube 8 which is to be bent, since it is not advisable to attempt to bend the tube 8 at a point closely adjacent to the ends of said heater, due to the fact that the glass is not adequately heated at that point. In case it is desired to bend longer sections, however, or to bend complicated reverse curves and the like which can not be conveniently manipulated at one time I have found that it is perfectly feasible to bend different portions of the tube successively. Thus one portion is heated, bent, and allowed to cool below the strain temperature, after which the heater is slid along the tube, and the cycle of operations repeated. Such a repeated heating of the tube 8 by sections would, of course, be impossible if it were not for the complete absence of strains as a result of my novel method of bending the tube.

In practice the operation may be materially speeded up by using two or more heaters in which the tubes 8 may be heated as the operator bends another tube 8. These heaters may either have separate energizing circuits, or a single circuit may be employed, the operator shifting it by suitable clips from one heater to the other as soon as he is through with heating one tube 8.

In some cases larger heating currents are also employed in order to expedite the operation, but in general it is preferred to use a slower heating rate, as hereinbefore described, since this allows the tube to practically come to equilibrium at the temperature required for bending, and also produces a greater uniformity in the temperature of the various parts of the tube 8. Likewise the resistance 7 may be varied to allow a larger current to flow initially, if desired, since this also will expedite the heating, without allowing the ultimate temperature to rise too high.

While I have described my invention by reference to certain specific embodiments thereof it is to be understood that it is not limited thereto, but that various omissions, substitutions and changes, within the scope of the appended claims, may be made either in the steps of the process or in the apparatus without departing from the spirit of my invention.

I claim as my invention:

1. The method of bending vitreous tubing and the like which comprises uniformly heating the entire portion to be bent to a temperature at which said tubing is plastic while maintaining atmospheric pressure therewithin, then applying increased pressure within said tubing and bending said tubing to a desired configuration while said increased pressure is maintained at a value which prevents change in the cross-section of said tubing.

2. The method of bending vitreous tubing which comprises uniformly heating the entire portion to be bent to a temperature at which said tubing is plastic, bending said tubing to a desired configuration, maintaining an increased pressure within said tubing while said tubing is being bent, and then restricting the cooling rate of said tubing until it has cooled below the strain temperature.

3. The method of bending vitreous tubing which comprises subjecting the entire portion to be bent to heat from a flexible resistance coil which forms a substantially continuous tube whereby said vitreous tubing is uniformly heated to a plastic temperature while maintaining atmospheric pressure therewithin, then applying increased pressure within said tubing just sufficient to prevent collapse of the walls thereof, and bending said heater and tubing together while said increased pressure is maintained to give said tubing a desired configuration while maintaining the temperature thereof substantially constant.

4. In apparatus for bending vitreous tubing, in combination, a substantially continuous flexible heater adapted to contain said tubing with the ends thereof projecting from said heater, said heater comprising an oxidized helix of resistance material with contiguous turns, a heat insulating jacket enclosing said heater, and means to thermally insulate the ends of said tubing adjacent to said heater.

5. In apparatus for bending vitreous tubing and the like, a substantially continuous flexible heater comprising a helix of ribbon shaped resistance material with contiguous turns substantially in contact with each other, the flat face of said ribbon material being exposed on the interior of said heater, whereby a substantially continuous metallic surface is provided against which said tubing can be forced during the bending thereof.

6. In apparatus for bending vitreous tubing, in combination, a flexible heater of electric resistance material adapted to surround said tubing, means to vent said tubing to the atmosphere as it is heated up, and means to increase the air pressure within said tubing while it is being bent within said heater by an amount which is just sufficient to prevent collapse of the walls thereof.

7. In apparatus for bending vitreous tubing, in combination, means to uniformly heat said tubing to a temperature at which it is plastic, means to vent said tubing to the atmosphere as it is heated up, a form of desired configuration about which said tubing is bent, means to maintain the temperature of said tubing substantially constant while said tubing is being bent about said form, and means to increase the air pressure within said tubing during said bending operation by an amount which is just sufficient to prevent collapse of the walls thereof.

WARREN R. WALKER.